United States Patent Office 2,947,634
Patented Aug. 2, 1960

2,947,634

PROCESS FOR PREPARING SOLUBLE COFFEE

Jacob R. Feldman, Maplewood, Harold S. Levenson, Morristown, and William V. White, Metuchen, N.J., assignors to General Foods Corporation, White Plains, N.Y., a corporation of Delaware No Drawing. Filed July 20, 1956, Ser. No. 598,993

18 Claims. (Cl. 99—71)

This invention relates to the production of an improved coffee aroma useful in the aromatization of soluble or "instant" coffee and food products generally; more particularly, this invention is concerned with a process for the separation and isolation of an improved coffee aroma from roasted coffee with various of its aroma fractions balanced as desired; the invention is also concerned with the aromatized products obtained by the utilization of such aromas.

Soluble or "instant" coffee powders are deficient in the aroma found in fresh roasted and ground coffee. Likewise dried cereal extracts are lacking in a desirable aroma. In the case of soluble coffee powder, i.e., the dried water extract of roasted coffee, considerable aroma is lost in the process of dehydrating the extract to a solid state. Generally it is difficult to retain or capture the aroma principles originating in roasted coffee in a coffee extract due to the volatilization and degradation of these aroma principles in drying. Attempts have been made to incorporate coffee aroma principles onto a dried coffee extract. The affinity of the aroma substances for the powder however is quite low such that careful storage and hermetic sealing is required to prevent escape of aroma from a container filled with such an aromatized product. After the container is opened it is not long before any remaining aroma therein escapes as the mass of particles is redistributed and consumed.

Prior art coffee aromas that have been proposed for the aromatization of foodstuffs and particularly coffee extracts vary in composition, amount and quality in accordance with the coffee processing step at which the aroma is recovered and isolated for later use. "Grinder gas" is relatively high in "tops" or low boiling aromatic coffee principles normally associated with freshness in coffee aroma, but low in the heavier higher boiling aromatics which provide body and balance to the aroma. Moreover, grinder gas provides only a very small quantity of the difficultly condensable or fugitive aromatic coffee principles such that the usefulness of such materials is practically negligible, not only because of the small amount that is liberated in the course of grinding the roasted coffee but also because of the difficulty of condensing them and later incorporating them into the soluble coffee product. Thus, grinder gas actually constitutes only a small fraction of the aromatic principles that make up a balanced coffee aroma like that associated with fresh roasted and ground coffee or the brew prepared therefrom.

Roaster gases, viz., the gases evolved and collectable during the roasting process, by themselves do not resemble true coffee aroma but rather are highly acidulous, pyrogenous and harsh due to the elevated temperatures at which they are evolved from roasted coffee. Moreover, such aromas are, like grinder gases, limited in their usefulness because of the small quantity which are recoverable in a useable form for aromatization of foodstuffs.

Another coffee aroma recovery approach which has been proposed involves subjecting roasted coffee to heat sufficient to drive off and permit the collection of aromatic coffee aroma principles. This approach, so-called "dry" distillation, is essentially a codistillation of aromatic constituents and moisture along with a volatilization of other fugitive aromatic constituents. The best process employs reduced pressures and slightly elevated temperatures as described in U.S. Patent No. 2,680,687 to Lemonnier, June 8, 1954. However, it has been noted that, although the coffee aroma separated and isolated in this manner has adequate low and medium boiling aromatics, it is distinctively low in the higher boiling aromatic constituents which provide a desirable "smoky" roasted character.

Other coffee aroma sources which have been proposed include coffee oil which has been extracted from roasted coffee by the use of volatile organic solvents. In attempting to distill the organic solvent from this coffee oil there is likely to occur a codistillation of aromatic constituents so that residual aroma in the oil is usually reduced and unbalanced in that there is a relatively higher loss of the lower boiling aromatics. Furthermore, in solvent extraction techniques there is generally required a series of steps involving exposure of the aromatic materials in the oil to air and heat such that the aromatics are subject to possible thermal decomposition, oxidation or hydrolysis, and thereby lose their coffee character.

Another coffee aroma source is expressed coffee oil, i.e., oil separated from roasted coffee by dividing it into smaller particles and compressing the particles; expressed coffee oil contains quantities of low, medium and high boiling aromatics such that when plated on soluble coffee powder it enhances the dried extract with a fragrant aroma. However, any substantial intensity of aroma supplied to the product in this manner usually requires a large quantity of expressed coffee oil to be applied. This causes the powder to have an unattractive wet appearance and to be less free flowing than a powder which is not plated with the oil.

It is an object of this invention to provide an improved fragrant, desirably balanced coffee aroma useful in the aromatization of foodstuffs generally and soluble coffee powder particularly.

Another object of this invention is to provide said improved coffee aroma in a form whereby it retains its strength and original aromatic character over a long storage and use period.

A further object of the invention is to provide an aroma product which can be uniformly incorporated onto a soluble coffee or like powder to aromatize it with an improved coffee aroma, the product being substantially free flowing and dry in appearance.

It has now been found that a strong desirably balanced and fragrant coffee aroma can be obtained by distilling aromatic materials from expressed coffee oil at subatmospheric pressures under mild temperature conditions. Under such conditions coffee aroma principles are separated from the oil in a controllable manner so that various of the desirable aroma fractions can be isolated and provided in the final product in the proportions desired. In carrying out the distillation fugitive low boiling aroma principles having a fragrance like that of grinder gas and lacking body are first distilled. Secondly, medium boiling aroma components are distilled. These provide body which is lacking in the more fugitive fraction mentioned above. In the later stages of distillation some higher boiling aromatic principles having a burnt or smoky roasted character are also separated from the oil. Their use in the aroma is usually desirable to provide balance but they are usually employed at low levels. In any event their distillation is at a low enough rate that their proportion in the aroma is readily controlled.

As a result the various aroma principles available in expressed coffee oil can be proportioned to provide the desired level of the roasted or smoky aroma principles with the other lower boiling aromatics.

The various aromas are distilled from the expressed coffee oil at temperatures ranging from 15°–100° C., temperatures ranging from room temperature to below 60° C. providing the more preferred aromas; during distillation the oil is maintained under absolute pressures (Hg) generally less than 50 mm., and preferably less than 10 mm. The most preferred distillation process involves subjecting expressed coffee oil at room temperature, i.e., 20°–35° C., to a pressure ranging from 10 mm. to about 4 microns. In this connection, it is to be understood that "room temperatures" vary according to different texts and there is no universally accepted standard, hence the temperature range 20°–35° C.; at any rate the phrase "room temperature" is employed to indicate that there is no application of heat to the coffee oil by any means other than that normally present in the atmosphere. Preferably the oil is provided in a thin film for distillation. Most preferably the oil is caused to move rapidly by the action of centrifugal force whereby a film having a thickness ranging from 10–100 microns is produced, the thickness of the film varying as a function of the temperature of the distilland. In the latter case a smooth-faced rotor for the distilland is provided whereby the aroma bearing oil is spread in a form from which the aromatics can volatilize readily from the oil without danger of thermal decomposition, polymerization, oxidation or hydrolysis. Of course, employing the higher distillation temperatures decreases the extent of absolute pressure reduction required to evaporate the desired aroma principles. However, employing such high temperatures increases the rate of evaporation of the higher boiling aroma principles such as those which provide a smoky, roasted character. Accordingly, if elevated temperatures are to be employed, this should preferably be at a later stage of distillation after the low and medium boiling aromatics have been substantially removed from the oil and during a period when the proportion of higher boiling aromatics for the desired aroma balance can be obtained at a controllable level. The desired proportion of higher boiling aromatics is thus obtained by controlling the period of distillation in addition to the distillation temperatures and pressures.

The collection of the aroma fractions which are brought over by evaporation from the expressed coffee oil under reduced pressure may be carried out in various ways. It is possible to condense the entire material at a temperature in the order of −196° C. and below, but to do so is wasteful of such expensive refrigerants as liquid nitrogen. Such refrigerants as liquid air, liquid nitrogen, liquid oxygen, liquid helium and others which are employed in providing substantially reduced temperatures will be found useful in condensing the more volatile or fugitive coffee aroma fractions. It will be found desirable to carry out the condensation in a number of stages. For example the condensation of the aroma components distilled from expressed coffee oil may be obtained in a three stage condensation, the first stage being cooled with a brine to a temperature between 0° and −15° C., the second stage being cooled with solid carbon dioxide to a temperature of the order −80° C. (B.P. of solid carbon dioxide) to condense the higher boiling aromatic constituents, while the third stage condenser is maintained at a temperature in the order of −196° C. (B.P. of liquid nitrogen) to condense the more volatile and lower boiling constituents. It is also possible to use a two stage condenser to condense all of the vapor and aromatic constituents brought over. Thus, the first stage condenser would be maintained at the temperature of solid carbon dioxide, the second stage being maintained at a temperature corresponding to that yielded by liquid nitrogen.

In addition to the condensing processes detailed above for collecting the aroma fractions evaporated from the expressed coffee oil, it is also possible to employ a process of desorption. Such a process involves the use of an inert gas such as nitrogen, helium, carbon dioxide or the like to sweep the expressed coffee oil and thereby collect the more fugitive aromatic constituents. Thereafter the higher boiling aromatic constituents can be evaporated and condensed in accordance with the aforementioned conditions and the aroma collected in such proportions of the various components required to provide the desired balance.

In any event, the more preferably balanced aroma separated and isolated in accordance with the present invention has been found to contain a proportion of those lower boiling aromatics which are condensed at a temperature corresponding to that of liquid nitrogen. However, many of the higher boiling aromatic components in this preferred aroma are condensable at temperatures generally below −0° C. at the distillation conditions specified.

The aroma recovered by the present process can be employed for the aromatization of soluble coffee and like powders by a number of well known processes such as the sweeping of the aroma by means of an inert gas through a mass of the powder to be aromatized. But it has been found that the desirably balanced aromatic constituents distilled from expressed coffee oil in accordance with this invention retain their balance for remarkably longer periods when they are incorporated in a lipophilic or oleaginous substance, e.g., an oil or a fat, which is high boiling and non-volatile. The latter act as aroma carriers enabling the aroma to be added to a food product such as soluble coffee powder and packaged in a container such as a glass jar where it will retain its fragrance, strength, balance and freedom from staleness for relatively long storage and use periods. The coffee aroma can be folded at a sufficiently high level to enable the concentrated aroma and aroma carrier combination to be incorporated into the food product without imparting an unattractive "wet" appearance to the product if it be in a powder form and without causing the powdered product to suffer from poor flowability. Among the various oils which can be employed as aroma carriers are refined and deodorized vegetable and animal oils. Suitable specific oils are soybean oil, cottonseed oil, corn oil, coconut oil, peanut oil, lard, beef tallow, mutton tallow and mineral oil. Expressed coffee oil is one of the more preferred aroma carriers due to the presence of natural emulsifiers in the oil, which enable the suspension and dispersion of relatively large quantities of the aroma. Expressed coffee oil which has been clarified is the most preferred carrier for suspending the aroma, although a dearomatized coffee oil can be employed with like advantage. Solvent extracted coffee oil can also be employed as an aroma carrier. A refined hydrogenated expressed coffee oil is also capable of carrying the coffee aroma principles therein. Due to the hardness of the hydrogenated coffee oil it may be advantageous to employ a blend of hydrogenated oil and the untreated expressed coffee oil, the blend being of an intermediate degree of hardness between the treated and untreated coffee oil such that it melts at a higher temperature and hence does not impair flowability or appearance of the product.

It has also been noted that when the aromatic coffee aroma constituents recovered by distillation from expressed coffee oil in accordance with the present invention are incorporated into the oleaginous substance that the impact of the aroma on the consumer is controlled so that it has a more pleasurable, even, yet sustained character. Thus, an oil such as expressed coffee oil acts to modulate the vapor pressures of various aromatic constituents required for the desired balance so that the overall aroma balance is more uniformly and controllably supplied from foodstuffs employing the thus aromatized oil.

It has been found that the use of a lipophilic or oleaginous substance generally as an aroma carrier is most desirable in affording to the consumer a variety of aromatic principles in a balanced aroma while at the same time avoiding any unpleasant sensation due to severe aroma impact stemming from the vapor pressures of various aromatic coffee constituents desirable for true coffee aroma.

Although the aromatics are preferably distilled in a still providing a rapidly moving thin film of the expressed coffee oil, a variety of other stills may also be employed such as the falling film type of still which comprises two concentric cylinders in which the expressed coffee oil is caused to flow in a thin film down the outer surface of the inner cylinder, the evaporated aroma being condensed in any suitable trap and the space enclosed by said cylinders being maintained under reduced pressure. Alternatively, the expressed coffee oil can be atomized into fine droplets in a chamber maintained at a reduced pressure, the aroma being collected in the aforesaid manner.

It is prefererd that the aroma recovered in accordance with the present invention be added to expressed coffee oil at a 5–10 fold level, i.e., that the aroma in 5–10 parts of coffee oil be concentrated in 1 part of expressed coffee oil. With a lower number of folds the quantity of aromatized oil which must be used in the aromatization of a product such as a soluble coffee powder is high such that flowability and appearance of the product is less acceptable. On the other hand, at folds higher than 10 the oil's ability to retain aroma is less to the extent that the aroma is lost by an aroma carrier, e.g., expressed coffee oil, on storage and is more likely to become unbalanced.

While the aroma with which the present invention is concerned may be employed in aromatizing a soluble coffee product such as a powder or even a liquid extract, a cereal beverage product prepared by roasting wheat, rye, chicory and other grains, or the corresponding soluble cereal beverage powder can be also aromatized.

Instead of incorporating the aroma with an "instant" powder it is also possible to use it for other flavoring purposes, as for example, in ice cream, icings, confectioneries, syrups and the like. Also, if desired, an antioxidant may be incorporated in the aroma to advantage whether it is incorporated in the instant coffee powder or used for the other flavoring purposes aforementioned. Such antioxidants may be any known to the art, e.g., caffeic acid, ethyl caffeate, nor-dihydroguiuretic acid, and the like.

The coffee aroma when folded into an oil carrier forms a highly aromatic "coffee oil" which can be incorporated onto the soluble coffee product in a variety of ways such as tumbling the powder in concurrent or countercurrent streams, or cooling droplets of the aromatized oil and mixing them with the powder.

The following detailed descriptions illustrate methods which may be employed in carrying out the process of the present invention: coffee oil was expressed from roasted coffee beans by means of a screw or auger type of press wherein the screw has flights traveling within a complementary perforated cage or screen concurrent to the feed of coffee. The roasted coffee is subdivided as it passes from the point of entry to the screw chamber in the area between the flights and the cage to the point of issuance of the residual coffee material as a meal. Although whole roasted coffee beans are the preferred source of coffee oil from the standpoint of yield of aroma bearing oil, ground roasted coffee also provides an acceptable source of expressed coffee oil. During the expressing process the subdivided coffee particles become heated and coffee oil is pressed from the particles and passes through the cage by the pressure exerted by the rotating flights against the inner walls of the cage. While a screw type of press is preferred other presses have been employed to obtain an expressed coffee oil which is usable in accordance to the present process.

The neighborhood of the expressing operation was cooled to a temperature below 300° F., and preferably is about 270° F. This is a sufficiently elevated temperature compatible with satisfactory yields of coffee oil and aroma therein. The pressure exerted on the coffee to provide the aroma in a high yield of coffee oil cannot be stated precisely or directly. Coffee oil is expelled in an acceptable condition using apparatus estimated at exerting 5,000 to 20,000 p.s.i. on the coffee. The pressures for adequate oil yield and aroma quality can be measured in terms of the temperatures of the expressed oil and the expeller cake or meal. The expeller cake or coffee meal should have a temperautre below 300° F. and should at least have a temperature of about 170° F. The expressed oil should have a temperature ranging from 100–250° F. when measured immediately after expression. Adherence to such meal and oil temperatures assures that the necessary pressures have been applied to the coffee to recover oil therefrom without undesirable modification of the aroma therein. The raw expressed coffee oil is preferably clarified in a basket type centrifuge to remove fines and foots contained in the oil. Residual fines in the coffee oil should be less than 3% and preferably less than 0.5%.

A high vacuum still described in U.S. 2,578,999 to Kenneth C. Hickman, December 18, 1951, was used to separate and isolate the desired aroma principles from the expressed coffee oil. This still includes a bell jar which can be evacuated by a forepump and a diffusion pump, the latter enabling the further reduction of absolute pressures by the forepump to a range below 1 mm. (Hg). The coffee oil in the bottom of the bell jar is raised by a lift pump and delivered to the face of a heated spinning 5" diameter rotor having an indented conical surface. The distilland is returned to a reservoir in the bell jar after having traveled to the periphery of the spinning rotor under the action of centrifugal force. The rotor acts as a surface over which the distilland is caused to flow in a rapidly moving thin film by centrifugal force. A liquid nitrogen cold trap comprising a hollow glass finger approximately 1½" in diameter and 5½" long is located between the rotor and the diffusion pump, the finger being cooled by liquid nitrogen poured therein.

The aforementioned bell jar was air-evacuated by means of the aforementioned forepump to an absolute pressure in the order of 250 microns. The cold finger in the condensing section of the still was filled with liquid nitrogen. Thereafter about 900 gms. of clarified expressed coffee oil were introduced to the bell jar by opening a valve feed which was reclosed after the oil was added. Then the lift pump was operated to deliver the oil to the spinning face of the rotor which was at about 30° C. The oil was caused to flow over the 5" diameter rotor in a thin film having a thickness in the order of 10–100 microns. The rotor was operated at about 1700 r.p.m. and all of the oil processed thereover in about 30–35 minutes. At the end of this cycle the absolute pressure in the still was in the order of 50 microns. The condensate in the liquid nitrogen cold trap was a substantially colorless frost.

After the first cycle, the oil was emptied from the reservoir to the bottom of the bell jar and the mechanical forepump was operated in combination with the diffusion pump. The first cycle was then repeated from the point of operation of the lift pump. As evaporation continued and the number of cycles increased there was a gradual lowering in the absolute pressure as indicated in the following table of pressures. The solid condensate or aroma frost condensing on the cold finger eventually became a light amber color.

| Cycle No. | Pressures on 5″ Still, microns | Extremes on 5″ Still, microns |
|---|---|---|
| 1 | 268 | 750–55 |
| 2 | 18 | 24–12 |
| 3 | 13 | 16–11 |
| 4 | 10 | 11–8 |
| 5 | 8 | 9–7 |
| 6 | 6 | 7–5 |
| 7 | 5 | 6–5 |
| 8 | 4 | 5–4 |
| 9 | 4 | 4 |

The aroma frost condensed from this 9 cycle operation, if allowed to heat up to room temperature, is observed to comprise in the order of 95% water and weighs about 1 gram. The aroma frost could be stored as a frost at the reduced temperature of liquid nitrogen. But preferably the aroma frost condensed on the liquid nitrogen cold trap was incorporated into 90–180 gms. of expressed clarified coffee oil depending upon the degree of aroma desired. This corresponds to a 5–10 fold oil. This is done by adding the oil to the liquid nitrogen cold finger on which it solidifies. Thereafter, the oil was allowed to warm up to room temperature in a closed vessel and the aromatized oil was shaken to distribute the aroma folded therein. The folded oil was then stored at 0° C. for later use. The aromatized coffee oil produced has a strong, fragrant coffee aroma quite like that of roasted and ground coffee and a balance of aroma principles including very low boiling "tops" having a fresh, sweet character, medium boiling aromas having a coffee-like body principle, and relatively high boiling compounds having a roasted or smoky character. If the aroma frost is allowed to adjust to room temperature, without being folded in the oil, it will change to a watery liquid which in a few hours changes from a light amber to a dark brown and in the process becomes unstable.

A four cycle operation like the nine cycle operation described herein above was employed and corresponded substantially to the process as described except for the distillation temperatures and pressures. The temperatures and pressures employed in this four cycle operation are tabulated below.

| Cycle Nos. | Pressures on 5″ Still (microns) | Extremes on 5″ Still (microns) | Temperatures of the distilland, ° C. |
|---|---|---|---|
| 1 | 250 | 750–55 | 30 |
| 2 | 30 | 100–40 | 30 |
| 3 | 20 | 50–20 | 50 |
| 4 | 15 | 30–5 | 50 |

A well balanced coffee aroma characterized as resembling the aroma of a "French roast" was collected in the liquid nitrogen cold trap. This aroma had a balance similar to the aroma of the aforementioned nine cycle operation except that it had more of a heavy, roasted, smoky character. The aroma was folded into the same quantity of expressed oil as in the first operation and stored in the same ways.

As a general proposition when the rotor temperatures and thus the temperatures of the expressed coffee oil distilland increase upward to 100° C. in the distillation apparatus employed in the specific operations described above, there is an increased concentration and hence proportion of the higher boiling aromatics in the distillate. As this trend in proportionation continues the increasing percentage of these higher boiling aromatics tends to decrease the desirability of the balance of aromas collected. Also as the number of cycles increases this trend in proportionation also prevails. At distillation temperatures in the order of 100° C., using the apparatus described in the specific examples, the distillation pressures employed thereat must not be substantially reduced, say to below 5 mm. absolute; otherwise materials will also be distilled which have noticeable undesirable off notes which may be characterized as burnt and harsh. Accordingly, due to the high rate of distillation of the higher boiling aromatics at such elevated temperatures and reduced pressures there is an overabundance thereof in the total aroma such that they are not in as fragrant a balance with the low and medium boiling aromatics and are not distilled at a controllable rate which provides the operator with opportunity to effect such balance. In following the distillation conditions of the present invention with a lower number of distillation cycles the yields are proportionately higher in the lower and medium boiling aromatics than in the higher boiling aromatics. The separation and isolation of the various constituents from expressed coffee oil, however, does not occur in distinct separate stages but rather there is a codistillation of the aromatics. This is particularly the case with the lower boiling compounds. Advantageously, the codistillation of these lower and medium boiling aromatics is always to be desired for a true coffee aroma and the aroma balance desired is achieved by controlling the separation and isolation of the higher boiling aromatics from the expressed coffee oil.

When the aromas distilled from the expressed coffee oil are incorporated into aroma absorbents or carriers such as expressed coffee oil, solvent extracted coffee oil and oils, fats or waxes, generally, the aroma product obtained thereby has an unusually long storage life during which the original balance, strength, and fragrance are substantially retained without the development of undesirable stale notes. In the case of a 5 fold aromatized coffee oil prepared from the condensate in the above nine cycle operation, when the 5 fold oil product is plated on a soluble coffee powder or like soluble beverage powder, it will retain its strength and fragrance for as long as three months. Preferably, the "aromatized" oil applied to the food product is packaged substantially in the absence of air and for this purpose therefore an inert gas such as carbon dioxide or notrogen should be used in packaging.

After a container of a food product aromatized by means of an oil or like aroma carrier having the balanced aroma incorporated therein is opened by the consumer, any remaining unconsumed portion retains its aromatic properties, over a period of use comparable to that usually required to consume all of the food product. For instance, in the case of the 5 fold coffee oil obtained from the 9 cycle operation of the specific example and plated at about a 0.5% level on soluble coffee powder, the product has a desirable aroma present even after normal daily home use of two weeks. It is a feature of this invention therefore, that the balanced aromas recovered from expressed coffee oil under the aforementioned distillation conditions, when incorporated in an oil or like aroma carrier, still provide a desirable aroma intensity and balance after a jar or other such container for a food product aromatized thereby is reopened from time to time.

A soluble beverage powder having an oil aromatized by the coffee aroma of the present invention requires only a relatively small quantity of the oil to be applied such that a thus aromatized powder will retain much of its original dry appearance and flowability. There is also a desirable reduction of any so-called "oil slick" on the surface of a beverage prepared from the aromatized powder such as black cup coffee, and a reduction of any turbidity or cloudiness appearing in the brew. Such an oil slick or scum as appears is due to the chance reflection of light by oil particles at the top of the beverage. The undesirable slick and turbidity are attributable to any fatty material present in the food product such as the dried coffee extract. By employing a high fold of aromas in an oil such as expressed coffee oil the tendency towards such a turbidity and "slick" is controlled to the degree that a beverage does not have these characteristics to any noticeable extent. Thus, an oil having a high concentration of the present aroma therein does not significantly contribute any unsightly or undesirable sticky appearance or poor flowability in a dry beverage powder, and is not present to the degree that it detracts from the appearance of beverage prepared therefrom.

It will be understood that while the invention has been described in part by means of specific examples reference should be had to the appended claims for a definition of the scope of the invention.

What is claimed is:

1. A process for preparing a fortified oil to be incorporated with the extract of roasted coffee which comprises expressing coffee oil from roasted coffee by subjecting said roasted coffee to pressures of at least 5,000 p.s.i., causing the aromatic constituents of said coffee oil to be distilled therefrom under mild temperatures while the oil is subjected to substantially reduced subatmospheric pressure, condensing the aromatics thus distilled from said coffee oil, and admixing said condensate with an oleaginous material to balance and stabilize said constituents therein.

2. A process according to claim 1 wherein the expressed oil recovered from the expressing operation has a temperature ranging from 100–250° F. upon expression and the coffee meal residue has a temperature ranging from 170–300° F., the neighborhood of the expressing operation being cooled to a temperature below 300° F.

3. A process according to claim 2 wherein the distillation is conducted by evaporation from a rapidly moving film of the oil formed on a moving surface at temperatures substantially below 100° C. and pressures from 50 millimeters to 4 microns of mercury.

4. A process according to claim 3 wherein the distillation temperatures range from room temperature to 60° C.

5. A process according to claim 3 wherein the distillation temperatures range from 20–35° C. and the pressures from 10 millimeters to 4 microns of mercury.

6. A process according to claim 2 wherein the distillation is conducted by atomizing the expressed coffee oil into a chamber maintained at a reduced pressure and temperatures substantially below 100° C., and collecting the aromatic volatiles released thereby.

7. A process according to claim 2 wherein the distillation is conducted by evaporation from a film of the oil formed on a rapidly spinning rotary surface at temperatures substantially below 100° C. and pressures from 50 millimeters to 4 microns of mercury.

8. A process according to claim 2 wherein the aromatics are condensed at a temperature in the order of −196° C. by cooling with liquid nitrogen.

9. A process according to claim 1 wherein the oleaginous liquid is a portion of that which is previously expressed.

10. A process for preparing a fortified oil to be incorporated with the extract of roasted coffee which comprises expressing coffee oil from roasted coffee by subjecting said roasted coffee to pressures of at least 5,000 p.s.i., causing the aromatic constituents of a major portion of said expressed coffee oil to be distilled therefrom under mild temperatures while the oil is subjected to substantially reduced subatmospheric pressure, condensing the aromatics thus distilled from said coffee oil, and admixing a plurality of distillate fractions obtained by removal of aromatic constituents from coffee oil with a unitary portion of said expressed coffee oil to balance and stabilize said aromatic constituents therein.

11. A process according to claim 10 wherein the oil recovered has a temperature ranging from 100–250° F. upon expression and the coffee meal residue has a temperature ranging from 170–300° F., the environment of the expressing operation being cooled to a temperature below 300° F.

12. A process according to claim 10 wherein the distillation is conducted by evaporation from a rapidly moving film of the oil formed on a moving surface at temperatures substantially below 100° C. and pressures from 50 millimeters to 4 microns of mercury.

13. A process according to claim 12 wherein the distillation temperatures range from room temperature to 60° C.

14. A process according to claim 12 wherein the distillation temperatures range from 20–35° C. and pressures of 10 millimeters to 4 microns of mercury.

15. A process according to claim 14 wherein the aromatic distillate, from five to ten portions of said expressed coffee oil, are admixed with one portion of said expressed coffee oil.

16. A process for preparing an improved soluble coffee product which comprises causing the oleaginous constituents of roasted coffee to be expressed therefrom by subjecting said roasted coffee to pressures of at least 5,000 p.s.i. and temperatures whereby the expressed oil recovered has a temperature ranging from 100–250° F. upon expression and the coffee meal residue has a temperature ranging from 170–300° F., causing the volatile aromatic constituents of said expressed coffee oil to be distilled therefrom at temperatures substantially below 100° C. and at substantially reduced subatmospheric pressures below 50 millimeters of mercury, condensing the distilled volatile aromatic constituents, stabilizing and balancing said constituents by adding them to an oleaginous liquid, and combining the aromatized oleaginous liquid produced with the extract of roasted and ground coffee.

17. A process according to claim 16 wherein the distillation is conducted at temperatures ranging from 20–35° C.

18. A process according to claim 16 wherein the distillation is conducted by evaporation from a rapidly moving film of the oil formed on a moving surface at temperatures substantially below 100° C. and pressures from 50 millimeters to 4 microns of mercury.

References Cited in the file of this patent

UNITED STATES PATENTS

| | | |
|---|---|---|
| 1,605,115 | Kellogg | Nov. 2, 1926 |
| 2,156,212 | Wendt et al. | Apr. 25, 1939 |
| 2,306,061 | Johnston | Dec. 22, 1942 |
| 2,350,903 | Kellogg | June 6, 1944 |
| 2,578,999 | Hickman | Dec. 18, 1951 |
| 2,680,687 | Lemmonier | June 8, 1954 |